A. H. PAPE.
MEANS FOR CONVERTING A COLLAPSIBLE TOP OF AN AUTOMOBILE INTO A CLOSED TOP.
APPLICATION FILED OCT. 27, 1919.

1,363,908.

Patented Dec. 28, 1920.
3 SHEETS—SHEET 1.

INVENTOR
A. H. PAPE

BY

ATT'Y

A. H. PAPE.
MEANS FOR CONVERTING A COLLAPSIBLE TOP OF AN AUTOMOBILE INTO A CLOSED TOP.
APPLICATION FILED OCT. 27, 1919.
1,363,908.
Patented Dec. 28, 1920.
3 SHEETS—SHEET 2.
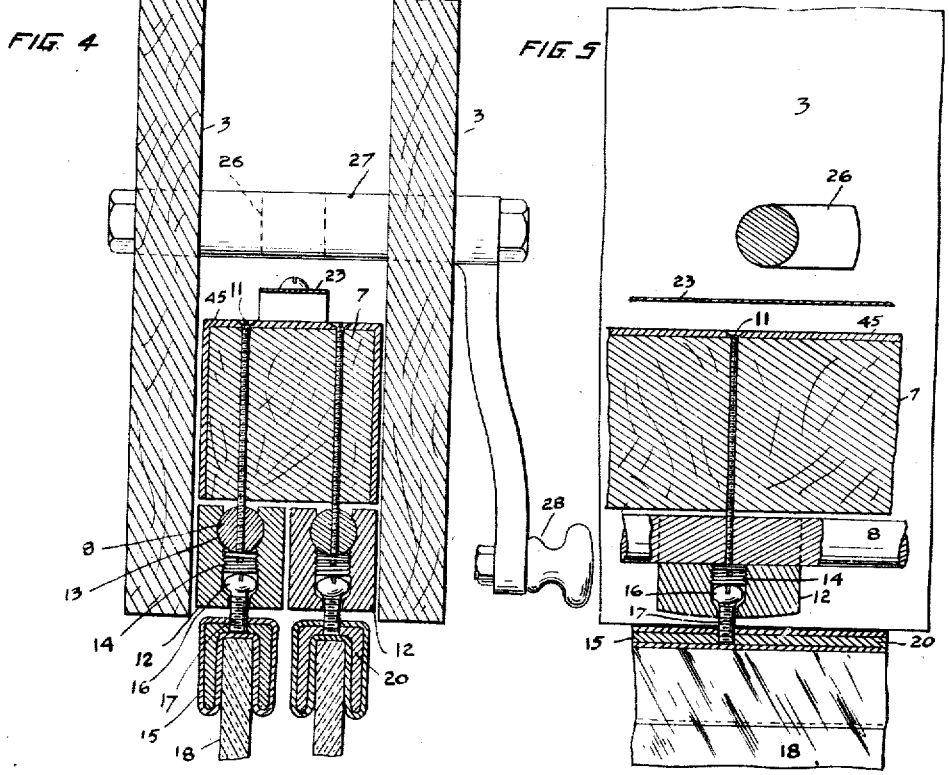
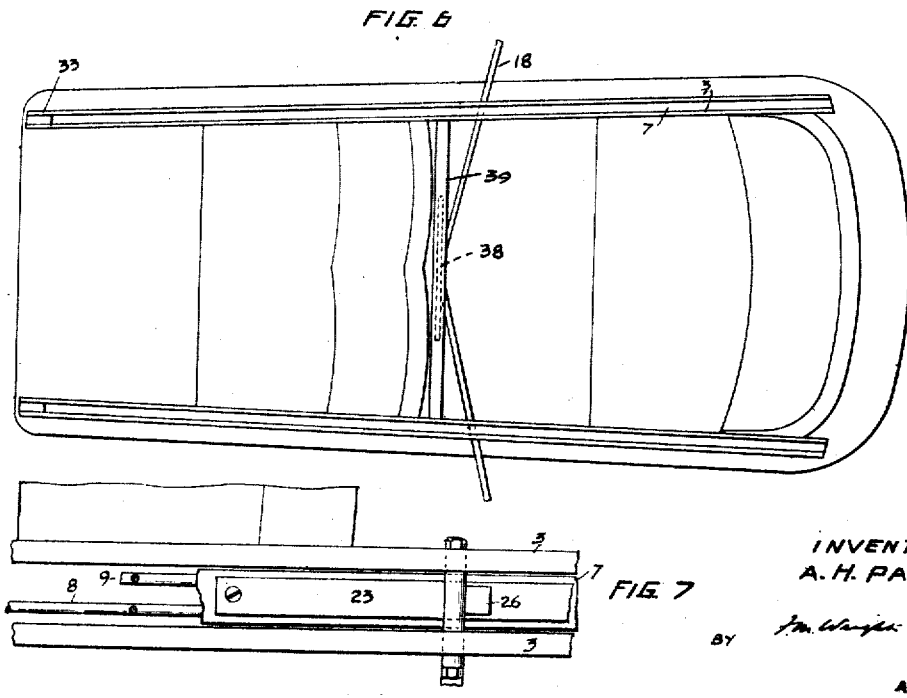
INVENTOR
A. H. PAPE
BY
ATT'Y A. H. PAPE.
MEANS FOR CONVERTING A COLLAPSIBLE TOP OF AN AUTOMOBILE INTO A CLOSED TOP.
APPLICATION FILED OCT. 27, 1919.

1,363,908.

Patented Dec. 28, 1920.

3 SHEETS—SHEET 3.

INVENTOR
A. H. PAPE

ATT'Y.

UNITED STATES PATENT OFFICE.

AUGUST H. PAPE, OF KENTFIELD, CALIFORNIA, ASSIGNOR OF ONE-HALF TO WILLIAM B. LARKINS, OF SAN FRANCISCO, CALIFORNIA.

MEANS FOR CONVERTING A COLLAPSIBLE TOP OF AN AUTOMOBILE INTO A CLOSED TOP.

1,363,908.    Specification of Letters Patent.    Patented Dec. 28, 1920.

Application filed October 27, 1919. Serial No. 333,441.

*To all whom it may concern:*

Be it known that I, AUGUST H. PAPE, a citizen of the United States, residing at Kentfield, in the county of Marin and State of California, have invented new and useful Improvements in Means for Converting Collapsible Tops of Automobiles into Closed Tops, of which the following is a specification.

The object of the present invention is to provide means for converting a collapsible top of an automobile into a closed top.

Figure 1:
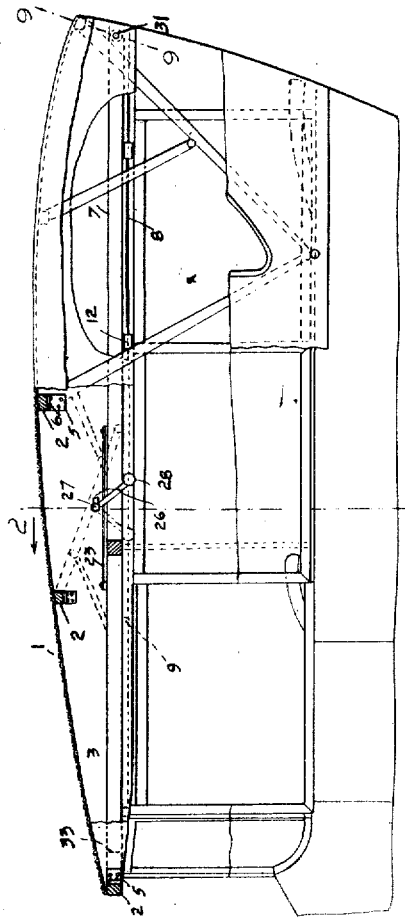
Figure 3:
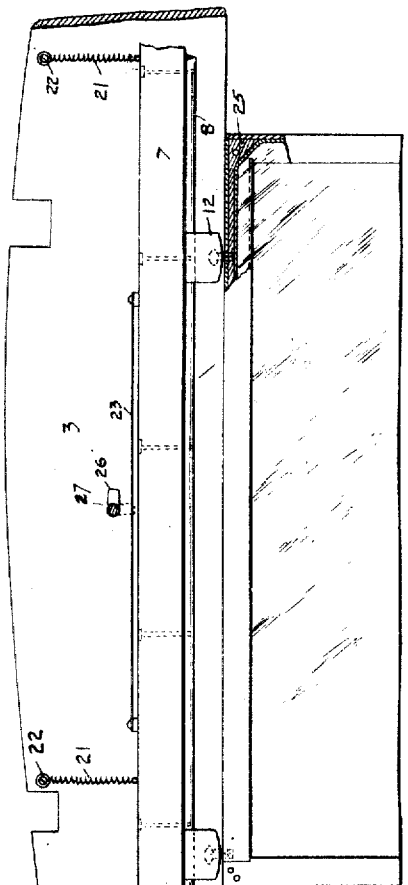
Figure 2:
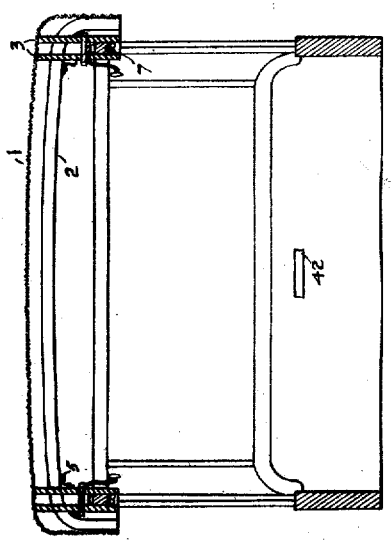
Figure 8:
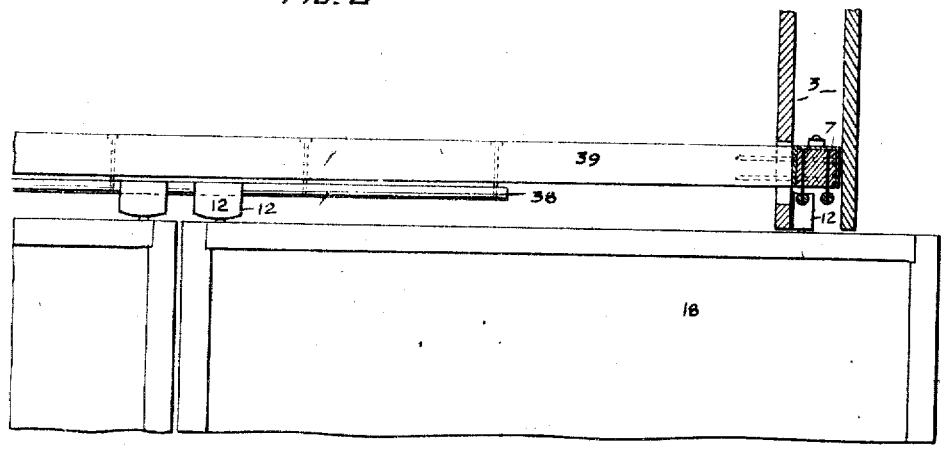
Figure 9:
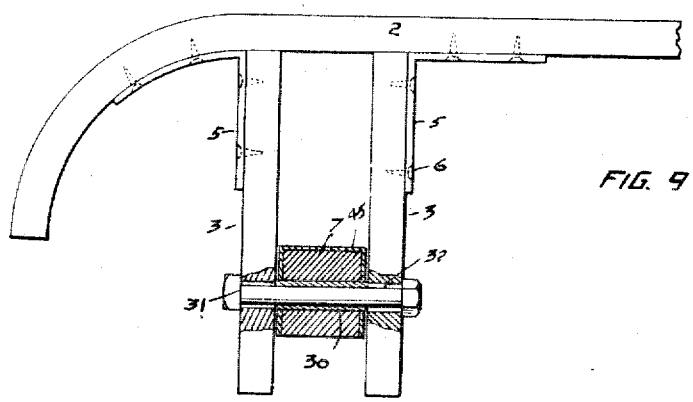
Figure 10:
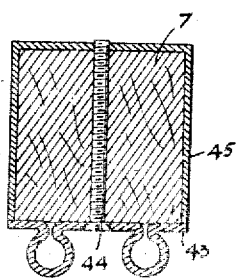

In the accompanying drawings, Figure 1 is a broken side view of the upper portion of an automobile; Fig. 2 is a cross section thereof on the line 2—2 of Fig. 1 looking forwardly; Fig. 3 is a broken side view of a part of the apparatus which I use for converting the top of the automobile into a closed top; Fig. 4 is an enlarged sectional view of a portion of Fig. 2; Fig. 5 is a sectional view of parts shown in Fig. 4, looking at right angles to Fig. 4; Fig. 6 is a plan view of the automobile top, the cover being removed, showing also the arrangement whereby the windows are converted into a rear wind shield; Fig. 7 is a plan view of a portion of said apparatus; Fig. 8 is a partial transverse section through the car showing the window converted into a rear wind shield; Fig. 9 is a broken rear view of a rear portion of the car; Fig. 10 is a sectional view of a modified form of track.

Referring to the drawing, 1 indicates the cloth top of an open car and 2 the bows thereof. Secured within said top, on each side, and extending parallel with the side of said top, is a pair of boards or plates 3, forming the foundation of my improved means for conversion. The lower edges of said plates are straight and horizontal and the upper edges thereof are curved to conform to the longitudinal curvature of the top of the car. Said plates are secured to the bows 2 by angle irons 5 and screws 6. Between each pair of plates is a metal flange 45 stiffening a longitudinal support 7 (Fig. 4) for tracks or rails 8, said tracks consisting of round rods extending longitudinally of the car.

One of said tracks or rails extends the whole length of the car, and the other extends forwardly just beyond the front window of the car, as shown at 9 in Figs. 1 and 7. Said rails are secured to said support by long screws 11, screwed through said support and into said rods. Upon said rails can travel slide blocks 12, each formed at the top with a longitudinally extending recess 13 curved concavely on its opposite sides to fit snugly against the convex sides of the rails.

Each block is formed with a central socket extending upwardly from its lower side and meeting said longitudinally extending recess and threaded in its upper portion and in the threaded upper portion of said socket is screwed a plug 14. The under side of said plug bears against the upper surface of the head 16 of a screw 17, said screws being placed in said socket from the top and screwed in the frame 15 of a window 18, the lower side of said frame being slidable upon the upper edge of the car body.

Springs 21 are secured to the support and to pins 22 extending between the plates and normally raise said support, thereby raising the rails and also the windows by reason of the heads of the screws being confined within the sockets. It results from this construction that, when the window is being moved, its lower edge is free from the upper edge of the car body. When, however, it has been moved to the position desired, the support is depressed and the windows are also depressed to rest upon the edge of the car body by means of an arm 26 (Figs. 3 and 5) extending from a shaft 27 mounted in the pair of boards or plates and carrying a handle 28 convenient for operation by a person within the car. Upon turning said handle, said arm is depressed, pressing down upon the center portion of a long spring 23 attached at its ends to the support 7, thereby providing resilient pressure on said support and preventing rattling and equalizing the pressure, and pressing the windows down upon the edge of the car body so that said windows are held firmly in position.

At the rear end, the plates of each pair are spaced from each other by a sleeve 30 around a bolt 31 which passes through a vertically elongated hole 32 in the rear part of the support, to allow the support to move freely vertically while preventing its longitudinal movement.

At the front end, the plates of each pair are spaced from each other by a block 33 sufficiently wide that the plates are spaced sufficiently far apart to permit the support to move freely therebetween.

I am able to utilize the rear windows for a rear wind shield by not extending the inner rail the whole length of the car. For this purpose, the rear window is moved forwardly until the front slide block 12 escapes from the forward end of the inner rail 9, then the rear window is turned about its rear slide block, which is still suspended from the rail, and can turn freely, and the screw head turns in the block remaining on the rail, until it extends in a transverse direction to the car, then the front block is caused to engage a single rail 38 suspended from a cross beam 39 and extending transversely in the middle portion of the car only a short distance. The ends of said cross beam 38 are passed through sufficiently large holes in the inner plates 3 and are secured in the supports 7 between the pairs of plates.

40 indicates a stop at the front end of the outside rail, or track, to prevent the slide blocks from moving off said rail. 41 indicates a pin or stop for limiting the upward movement of the support 7 due to the action of the springs 21.

In the form of track and support shown in Fig. 10, the rails are made of a pressed metal 43 fastened by screws 44 to the support 7 of the track.

In order to securely attach the window 18 to its supporting screw 17, there is interposed between the sides of the sheet metal frame 15 of the window an extra piece of metal 20, which, being pinned to the sheet metal frame by the pins 25, serves to connect the top side of the sheet metal frame to the vertical sides, as clearly shown in Fig. 3. This extra piece of metal also provides additional body for the screws 17 to be screwed into.

I claim:—

1. In combination with a collapsible top of an automobile, frames secured to the frame of said top, one on each side of the automobile, a vertically movable upper window track supported by said frame, a window the lower edge of which is movable over the upper edge of the body of the automobile, slide blocks secured to the upper edge of the window and slidable upon said track and means for vertically moving the track to move said windows into and out of contact with the upper edge of the automobile body.

2. In combination with a collapsible top of an automobile, frames secured to the frame of said top, one on each side of the automobile, an upper window track supported by each frame, resilient means for supporting the track on the frame, a window, the lower edge of which is movable over the upper edge of the body of the automobile, and slide blocks secured to the upper edge of the window and slidable upon said track, and means for depressing the track and stretching said resilient means.

3. In combination with a collapsible top of an automobile, frames secured to the frame of said top, one on each side of the automobile, an upper window track supported by each frame, resilient means for supporting the track on the frame, a window, the lower edge of which is movable over the upper edge of the body of the automobile and slidable upon said track, and resilient means applied to a plurality of points on the track for depressing the track and stretching said resilient means.

4. In combination with a collapsible top of an automobile, frames secured to the frame of said top, one on each side of the automobile, an upper window track supported by each frame, resilient means for supporting the track on the frame, a window, the lower edge of which is movable over the upper edge of the body of the automobile, and slide blocks secured to the upper edge of the window and slidable upon said track and means for depressing the track and stretching said resilient means, and means for limiting the upward movement of said track due to said resilient support.

5. In an automobile, the combination of a window, the lower edge of which is adjacent to the upper edge of the frame of the automobile, a longitudinal track, the upper edge of the window being provided with means adapted to slide along said track, means for raising said track to raise the lower edge of the window from off the upper edge of said automobile frame, and means for depressing said track to press said lower edge against the upper edge of said frame.

6. In an automobile, the combination of a window, the lower edge of which is adjacent to the upper edge of the frame of the automobile, a longitudinal track, the upper edge of the window being provided with means adapted to slide along said track, means for resiliently raising said track to raise the lower edge of the window from off the upper edge of said automobile frame, and means for depressing said track to press said lower edge against the upper edge of said frame.

7. In combination with a collapsible top of an automobile and a frame therefor, guides secured to said frame in said top, a support movable vertically between said guides, window tracks secured to the under side of said support, windows slidable upon the tracks and means for moving said support vertically to move the windows into and out of contact with the body of the automobile.

8. In combination with a collapsible top of an automobile and a frame therefor, boards secured to said frame in said top, a support movable vertically between said boards, window tracks secured to the under side of said support, springs for raising said support and means for depressing said support against said springs.

9. In combination with a collapsible top of an automobile and a frame therefor, a pair of vertical boards secured to said frame in said top, a support movable vertically between said boards, window tracks secured to the under side of said support, springs for raising said support and means for exerting a resilient pressure at a plurality of points against the action of said springs.

10. In combination with a collapsible top of an automobile and a frame therefor, a pair of vertical boards secured to said frame in said top, a support movable vertically between said boards and window tracks secured to the under side of said support, one only of said tracks extending the full length of the car, windows slidable upon said tracks, the windows slidable upon the shorter track being slidable at two points thereon and a transverse track, to which one of said slidable connections can be transferred.

11. In combination with a collapsible top of an automobile and a frame therefor, a pair of vertical boards secured to said frame in said top, a support movable vertically between said boards, window tracks secured to the under side of said support, one only of said tracks extending the full length of the car, windows slidable upon said tracks, the windows slidable upon the shorter track being slidable at two points thereon and a transverse track, to which one of said slidable connections can be transferred and a support at the back of the front seat for supporting said latter window.

AUGUST H. PAPE.